United States Patent
Wu et al.

(10) Patent No.: US 10,211,655 B2
(45) Date of Patent: Feb. 19, 2019

(54) SCHEME FOR ACTIVATING OR DEACTIVATING SHIPPING MODE FOR BATTERY VIA BATTERY CONNECTING INTERFACE WITHOUT ADDITIONAL SIGNAL PORT(S)

(71) Applicant: MEDIATEK INC., Hsin-Chu (TW)

(72) Inventors: Jui-Chi Wu, Taichung (TW);
Chi-Ming Lee, Hsinchu (TW);
Chih-Yuan Hsu, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 14/822,877

(22) Filed: Aug. 10, 2015

(65) Prior Publication Data
US 2016/0049815 A1 Feb. 18, 2016

Related U.S. Application Data

(60) Provisional application No. 62/037,256, filed on Aug. 14, 2014.

(51) Int. Cl.
*H02J 7/00* (2006.01)

(52) U.S. Cl.
CPC ............ *H02J 7/0029* (2013.01); *H02J 7/007* (2013.01); *H02J 7/0031* (2013.01); *H02J 7/0045* (2013.01); *H02J 2007/004* (2013.01)

(58) Field of Classification Search
CPC .... B60R 2021/23153; B60R 2022/208; B60R 21/01532; B60R 21/01544; G06F 1/26; G06F 3/0237; H02J 7/0004; H02J 7/0008; H02J 7/0011; H02J 7/0068; H02J 9/061; H02J 7/0027; H02J 7/0042; H02J 7/0065

USPC .................................................. 320/107–115
See application file for complete search history.

(56) References Cited

U.S. PATENT DOCUMENTS

| | | | |
|---|---|---|---|
| 2005/0077878 A1 | 4/2005 | Carrier | |
| 2007/0103113 A1 | 5/2007 | Embrey | |
| 2008/0309291 A1 | 12/2008 | Cha | |
| 2010/0097118 A1* | 4/2010 | Wang | H02J 9/005 327/427 |
| 2010/0194348 A1* | 8/2010 | Wang | H01M 10/48 320/136 |

(Continued)

FOREIGN PATENT DOCUMENTS

| CN | 101409456 A | 4/2009 |
|---|---|---|
| CN | 101882701 A | 11/2010 |

(Continued)

OTHER PUBLICATIONS

Jui-Chi Wu et al., Title: Method for Reading, Writing, or Updating Information for Battery Cell Via Connecting Interface Between Portable Device and Battery Pack Including Battery Cell so as to Obtain Precise Information, pending U.S. Appl. No. 14/895,928, filed Dec. 3, 2015.

(Continued)

*Primary Examiner* — Binh Tat
(74) *Attorney, Agent, or Firm* — Wolf, Greenfield & Sacks, P.C.

(57) ABSTRACT

A method for controlling a state of a battery includes: providing and using a specific connecting interface to connect the battery and a portable device; and controlling the battery to enter a shipping mode and exit the shipping mode by using the specific connecting interface.

5 Claims, 8 Drawing Sheets

(56) References Cited

U.S. PATENT DOCUMENTS

| | | | |
|---|---|---|---|
| 2011/0107120 A1 | 5/2011 | Nakashima | |
| 2011/0267009 A1 | 11/2011 | Nakatsuji et al. | |
| 2013/0020875 A1 | 1/2013 | Wozniak | |
| 2013/0134944 A1 | 5/2013 | Son | |
| 2013/0200841 A1* | 8/2013 | Farkas | H02J 7/0042 320/107 |
| 2013/0314047 A1* | 11/2013 | Eagle | G06F 1/3212 320/127 |
| 2014/0167700 A1 | 6/2014 | Chen | |

FOREIGN PATENT DOCUMENTS

| | | |
|---|---|---|
| CN | 102055219 A | 5/2011 |
| CN | 102859825 A | 1/2013 |
| CN | 102957193 A | 3/2013 |
| CN | 103872719 A | 6/2014 |
| JP | 2014113001 | 6/2014 |
| WO | 2013112610 A1 | 8/2013 |
| WO | 2014198231 A1 | 12/2014 |

OTHER PUBLICATIONS

"International Search Report" dated Sep. 22, 2014 for International application No. PCT/CN2014/079811, International filing date:Jun. 13, 2014.

* cited by examiner

SCHEME FOR ACTIVATING OR DEACTIVATING SHIPPING MODE FOR BATTERY VIA BATTERY CONNECTING INTERFACE WITHOUT ADDITIONAL SIGNAL PORT(S)

CROSS REFERENCE TO RELATED APPLICATIONS

This application claims the benefit of U.S. Provisional Application No. 62/037,256, which was filed on Aug. 14, 2014.

BACKGROUND

The invention relates to a battery management scheme, and more particularly to a scheme for dynamically activating and deactivating a shipping mode for the battery via a specific connecting interface that connects the battery to a portable device.

Generally speaking, a portable device including a battery may be transferred from another place or country by ocean shipping or sea shipping for several days after leaving factory to the market. In this situation, even though the portable device is powered off, internal circuits within the portable device still consume power-off leakage currents from the battery. Accordingly, the remaining capacity of the battery may be not enough for a user to enable the system on the portable device if the power-off leakage currents become higher. It is important to provide a novel scheme to solve this problem.

SUMMARY

Therefore one of the objectives of the invention is to provide a scheme for dynamically activating and deactivating a shipping mode for the battery via a specific connecting interface that connects the battery to a portable device. This scheme would not employ additional signal port (s) to deactivate or release the shipping mode, and circuit costs can be saved.

According to an embodiment of the invention, a method for controlling a state of a battery is disclosed. The method comprises: providing and using a specific connecting interface to connect the battery and a portable device; and controlling the battery to enter a shipping mode and exit the shipping mode by using the specific connecting interface.

According to an embodiment of the invention, a system comprising a portable device, a battery, and a specific connecting interface is disclosed. The battery is coupled to the portable device and configured to provide power for the system operating on the portable device. The specific connecting interface is configured to connect between the portable device and the battery. The portable device is arranged to control the battery to enter a shipping mode and exit the shipping mode by using the specific connecting interface.

According to an embodiment of the invention, a battery connected to a portable device via a specific connecting interface is disclosed. The battery comprises a battery cell and a control circuit. The control circuit is coupled to the battery cell and the specific connecting interface, and is configured to detect a signal of the specific connecting interface and to determine entering a shipping mode and exiting the shipping mode according to the signal of the specific connecting interface.

in the embodiments, a portable device can make a battery enter or exit the shipping mode via a connecting interface. It is not necessary to additionally employ a signal port to enable/disable the shipping mode. Circuit costs can be effectively reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
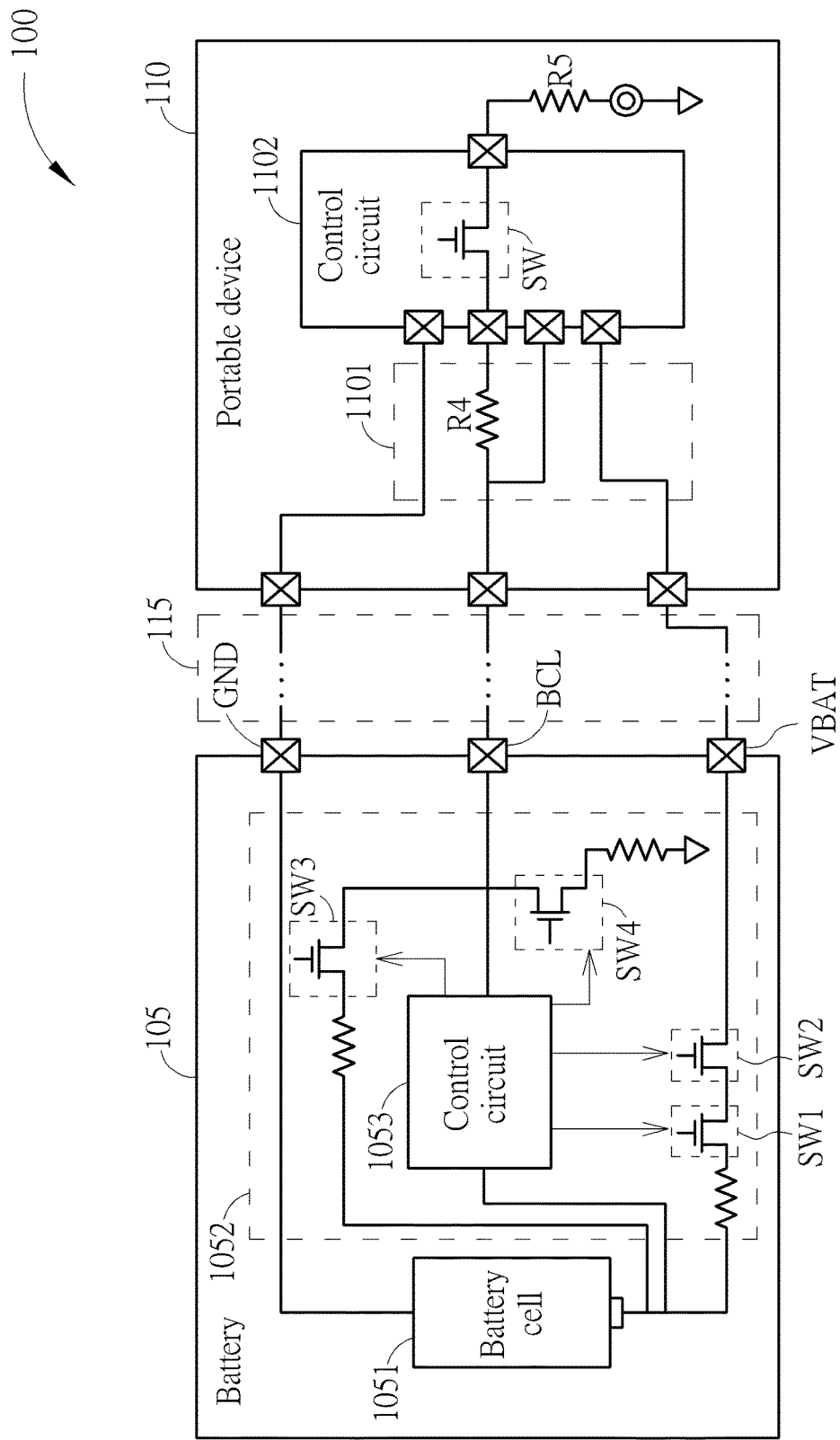
FIG. 1 is a diagram of a system according to a first embodiment of the invention.

Please refer to FIG. 1, which is a diagram of a system 100 according to a first embodiment of the invention. The system 100 comprises a battery 105, a portable device 110, and a specific connecting interface 115. The specific connecting interface 115 is used for connecting between the battery 105 and the portable device 110. For example, the specific connecting interface 115 may be implemented by using the MIPI battery interface (MIPI BIF). The portable device 110 and the battery 105 can communicate with each other via the specific connecting interface 115. The specific connecting interface 115 comprises a supply line VBAT, a battery communication line BCL, and a ground line GND. In this embodiment, a user can press a power key at the side of the portable device 110 to deactivate or release a shipping mode of the battery 105 via the battery communication line BCL; however, this is not meant to be a limitation of the invention. In another embodiment, the user may press the power key to deactivate or release the shipping mode of the battery 105 via the supply line VBAT. In addition, the user from the portable device 110 may activate or enable the shipping mode of battery 105 via the battery communication line BCL or the supply line VBAT. That is, the user can activate or deactivate (i.e. release) the shipping mode of battery 105 via signal transmission of the specific connecting interface 115. When the shipping mode is enabled or activated, this may mean that the system 100 is to be transferred from another place or country by ocean shipping or sea shipping for several days, and enabling the shipping mode can effectively save more power of battery 105 during this time period and will make the portable device 110 immediately reply to the user's control if needed. Enabling the shipping mode is also suitable for a condition that the user merely would not like to operate the portable device 110 for several days.

In practice, the battery 105 comprises a battery cell 1051 and an internal circuit 1052. The internal circuit 1052 comprises a control circuit 1053 and a charging/discharging path that includes four switching units SW1-SW4. The portable device 110 comprises a transmitting circuit 1101 and a control circuit 1102. The transmitting circuit 1101 comprises a resistor R4, and the control circuit 1102 comprises a switch unit SW that can be regarded as a power key connected to a resistor R5 and a power source. The control circuit 1053 is used for controlling the two switching units SW1 and SW2 disposed on the charging/discharging path so as to charge or discharge the battery cell 1051. The control circuit 1053 can be also used for protecting the battery cell 1051. In addition, the control circuit 1053 can be used for storing information of control data, battery percentage, aging factor(s), battery cycle, battery capacity, and so on. The control circuit 1102 of portable device 110 can read information of control data, battery percentage, aging factors, battery cycle, and battery capacity from the internal circuit 1052 at the side of battery 105 via the connecting interface 115. In addition, the control circuit 1103 can also write information from the portable device 110 into the internal circuit 1052 within the battery 105 via the connecting interface 115.

Figure 2A:
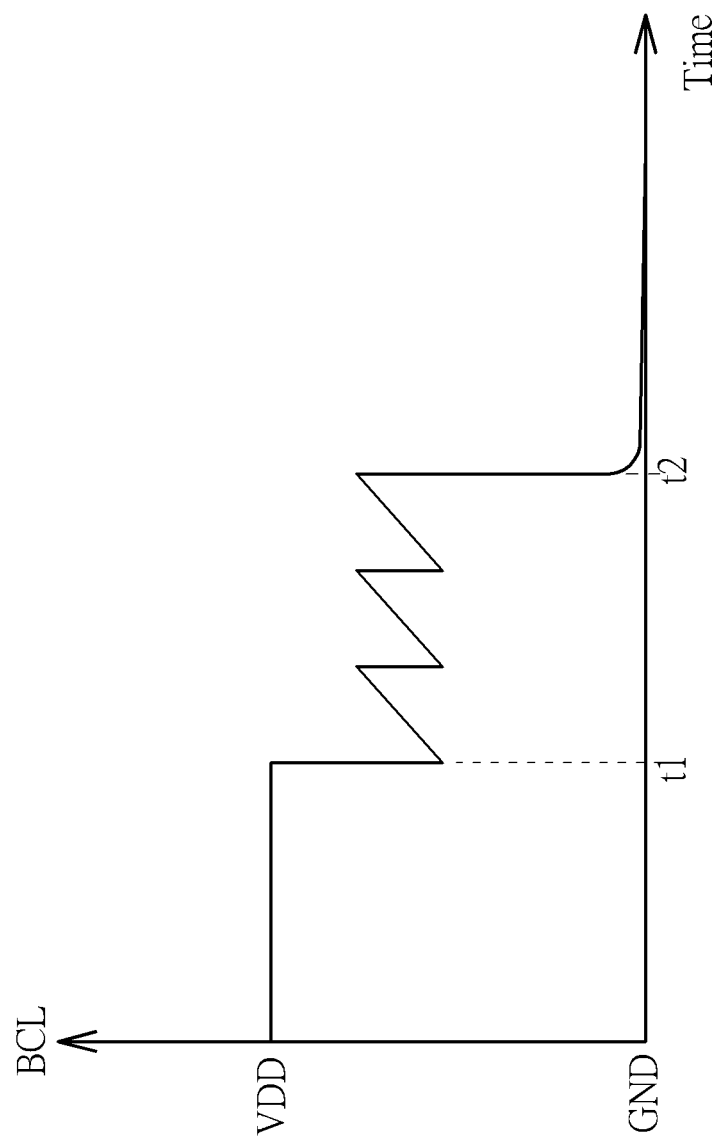
FIG. 2A is a diagram illustrating a waveform of BCL when the shipping mode is deactivated or released according to the embodiment of FIG. 1.
Figure 2B:
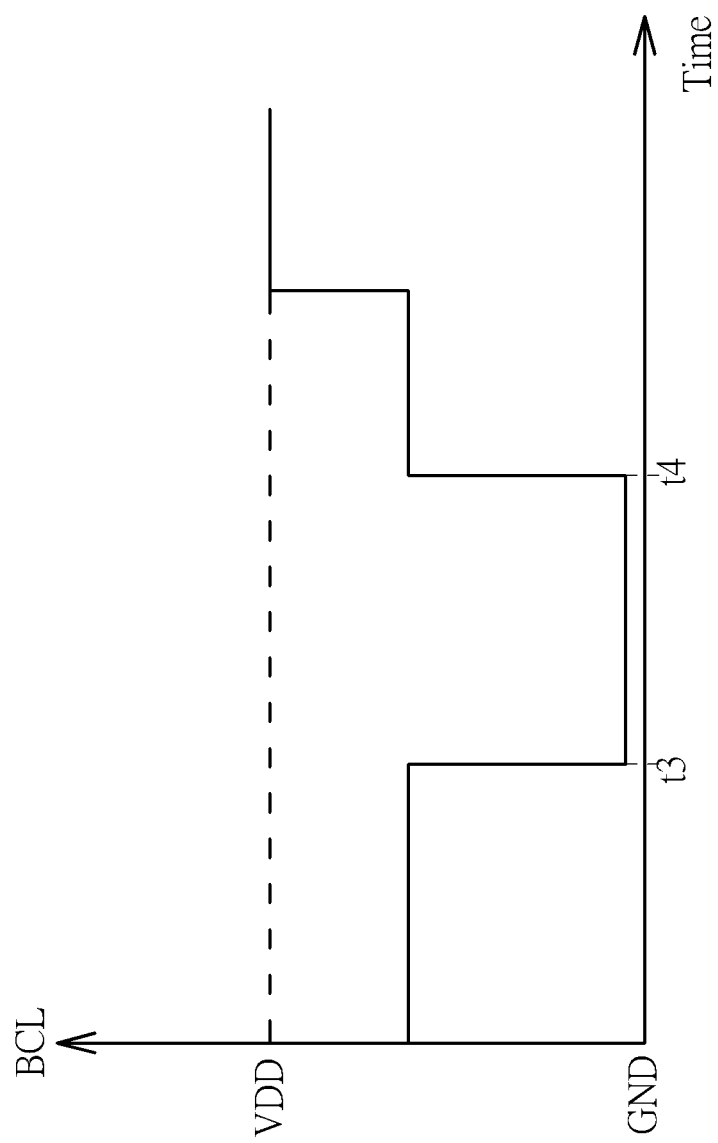
FIG. 2B is a diagram illustrating the waveform of BCL when the shipping mode is activated according to the embodiment of FIG. 1.

For the operation of shipping mode, the portable device 110 is arranged to change a voltage level at the battery communication line BCL from a first level to a second level so as to control the battery 105 to enter the shipping mode or to exit and release the shipping mode. Please refer to FIG. 1 in conjunction with FIG. 2A and FIG. 2B. FIG. 2A is a diagram illustrating a waveform of a signal level at the battery communication line BCL when the shipping mode is deactivated or released according to the embodiment of FIG. 1. FIG. 2B is a diagram illustrating the waveform of the signal level at battery communication line BCL when the shipping mode is activated according to the embodiment of FIG. 1. When the system 100 (or the battery 105) enters the shipping mode, the control circuit 1053 controls the switch units SW1 and SW2 to be open, and the path from the battery cell 1051 to the level at the supply line VBAT becomes disconnected. In addition, the control circuit 1053 controls the switch unit SW3 to be closed and the switch unit SW4 to be open under the shipping mode. Thus, under the shipping mode, the voltage level at battery communication line BCL is almost equal to a logic high level such as a supply level VDD. Since the control circuit 1053 merely consumes a smaller current and almost all discharging paths for the battery cell 1051 are disconnected, power-off leakage currents become almost zero.

When a user enables the system 100 (or portable device 110) by pressing the power key at the side of portable device 110, the switch unit SW becomes closed, and the level at battery communication line BCL becomes lower. Via the connecting interface 115, the control circuit 1053 at the side of battery 105 can detect the level at BCL by performing shipping mode detection to know whether the user presses the power key. In this situation, to deactivate or release the shipping mode, the control circuit 1503 controls the switch unit SW3 to be open and the switch unit SW4 to be closed. Accordingly, the level at BCL is discharged via a resistor to the ground level GND and becomes lower. As shown in FIG. 2A, the vertical axis indicates the level at BCL, and the horizontal axis indicates different timings. Before timing t1, the system 100 is operating under the shipping mode, and the level at BCL is kept at a high level (e.g. a first level). From timing t1 to timing t2, the system 100 performs shipping mode detection and detects that the level at BCL becomes lower (e.g. a second level) due to that the user presses the power key. Accordingly the control circuit 1503 is arranged to control the switch unit SW3 to be open and the switch unit SW4 to be closed. After timing t2, the system 100 (or battery 105) has released/exited the shipping mode.

The system 100 (or battery 105) may enter the shipping mode. The portable device 110 can change the voltage level at the battery communication line BCL from a first level to a second level so as to control the battery 105 to enter the shipping mode. As shown in FIG. 2B, it is assumed that the system 100 (or battery 105) operates under a normal mode before timing t3. To enter the shipping mode, from timing t3 to timing t4, the control circuit 1102 can send a shipping mode enable signal to the control circuit 1053 via the battery communication line BCL of the connecting interface 115, and this shipping mode enable signal makes a change for the voltage level at battery communication line BCL. After receiving the shipping mode enable signal, the control circuit 1053 controls the switch units SW1 and SW2 to be open so that the discharging path from battery cell 1051 to ground level GND can be disconnected. In addition, the control circuit 1053 controls the switch unit SW3 to be closed and the switch unit SW4 to be open so that the voltage level of BCL can be kept at a higher level such as VDD. As shown in 2B, the control circuit 1053 can delay several seconds and then enter the shipping mode after receiving the shipping mode enable signal during t3-t4 via the battery communication line BCL of connecting interface 115.

Additionally, in other embodiments, a portable device can be arranged to control a battery to enter and/or exit the shipping mode by different signal transmission via the battery communication line BCL of a specific connecting interface. Please refer to FIG. 3, which is a diagram of a system 300 according to a second embodiment of the invention. The system 300 comprises a battery 305 and a portable device 310. A specific connecting interface 315 is employed and used for connecting between the battery 305 and the portable device 310. For example, the specific connecting interface 315 may be implemented by using the interface of MIPI BIF standard. The portable device 310 and the battery 305 can communicate with each other via the specific connecting interface 315. The specific connecting interface 315 comprises a supply line VBAT, a battery communication line BCL, and a ground line GND. In this embodiment a user can press a power key at the side of the portable device 310 to deactivate a shipping mode of the battery 305 via the battery communication line BCL; however, this is not meant to be a limitation of the invention. In addition, the user from the portable device 310 may activate the shipping mode of battery 305 via the battery communication line BCL. That is, the user can activate or deactivate (i.e. release) the shipping mode of battery 305 via signal transmission of the specific connecting interface 315. When the shipping mode is enabled or activated, this may mean that the system 300 is to be transferred from another place or country by ocean shipping or sea shipping for several days, and enabling the shipping mode can effectively save more power of battery 305 and makes the portable device 310 immediately reply to the user's control if needed. Enabling the shipping mode is also suitable for a condition that the user merely would not like to operate the portable device 310 for several days.

In practice, the battery 305 comprises a battery cell 3051 and an internal circuit 3052. The internal circuit 3052 comprises a control circuit 3053 and a charging/discharging path that includes four switch units SW1-SW2 and SW5-SW6. The portable device 310 comprises a transmitting circuit 3101 and a control circuit 3102. The transmitting circuit 3101 comprises a resistor R4, and the control circuit 3102 comprises a switch unit SW that can be regarded as a power key connected to a resistor R5. The control circuit 3053 is used for controlling the two switch units SW1 and SW2 disposed on the charging/discharging path to charge or discharge the battery cell 3051. The control circuit 3053 can be also used for protecting the battery cell 3051. In addition, the control circuit 3053 can be used for storing information of control data, battery percentage, aging factor(s), battery cycle, battery capacity, and so on. The control circuit 3102 of portable device 310 can read information of control data, battery percentage, aging factors, battery cycle, and battery capacity from the internal circuit 3052 at the side of battery pack 305 via the connecting interface 315. In addition, the control circuit 3102 can also write information from the portable device 310 into the internal circuit 3052 within the battery 305 via the connecting interface 315.

Figure 3:
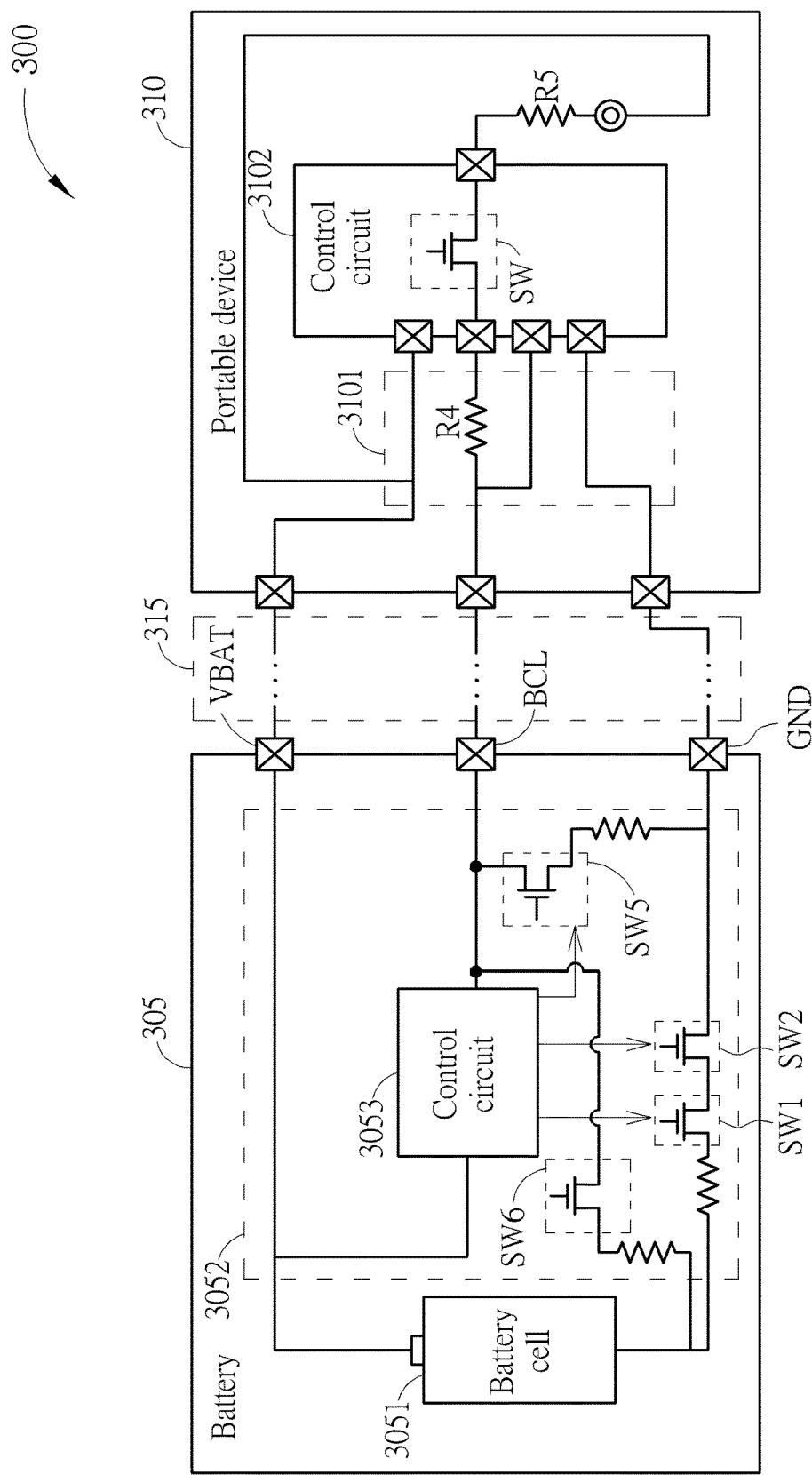
FIG. 3 is a diagram of a system according to a second embodiment of the invention.
Figure 4A:
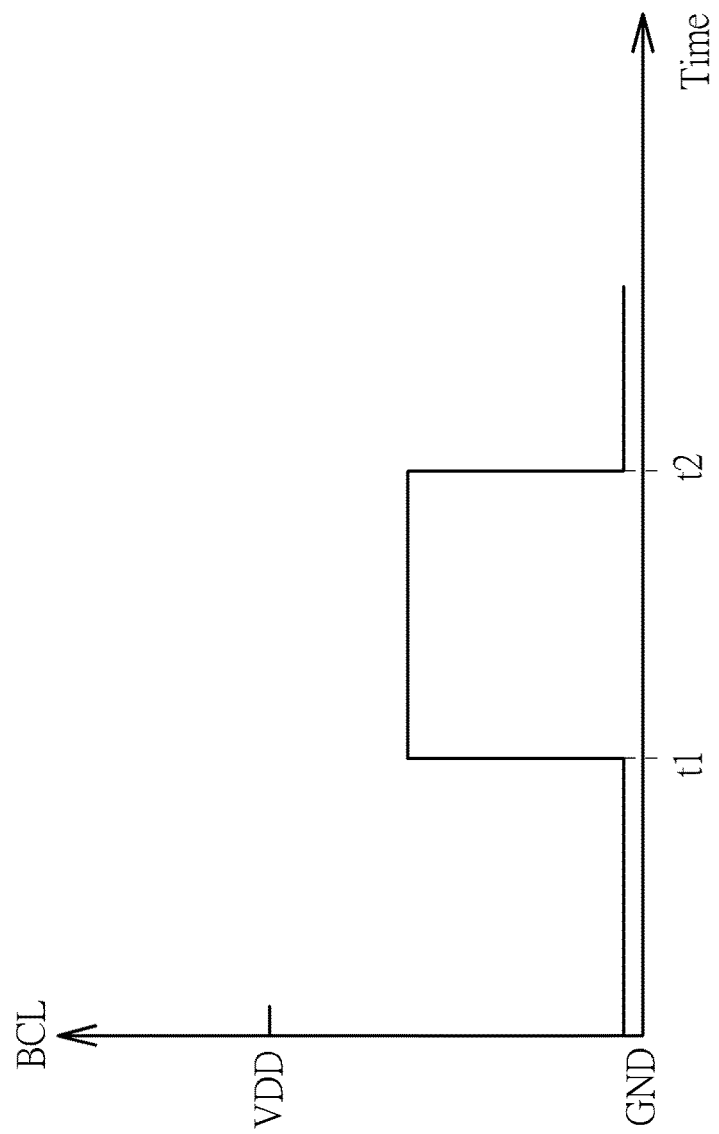
FIG. 4A is a diagram illustrating a waveform of BCL when the shipping mode is deactivated or released according to the embodiment of FIG. 3.
Figure 4B:
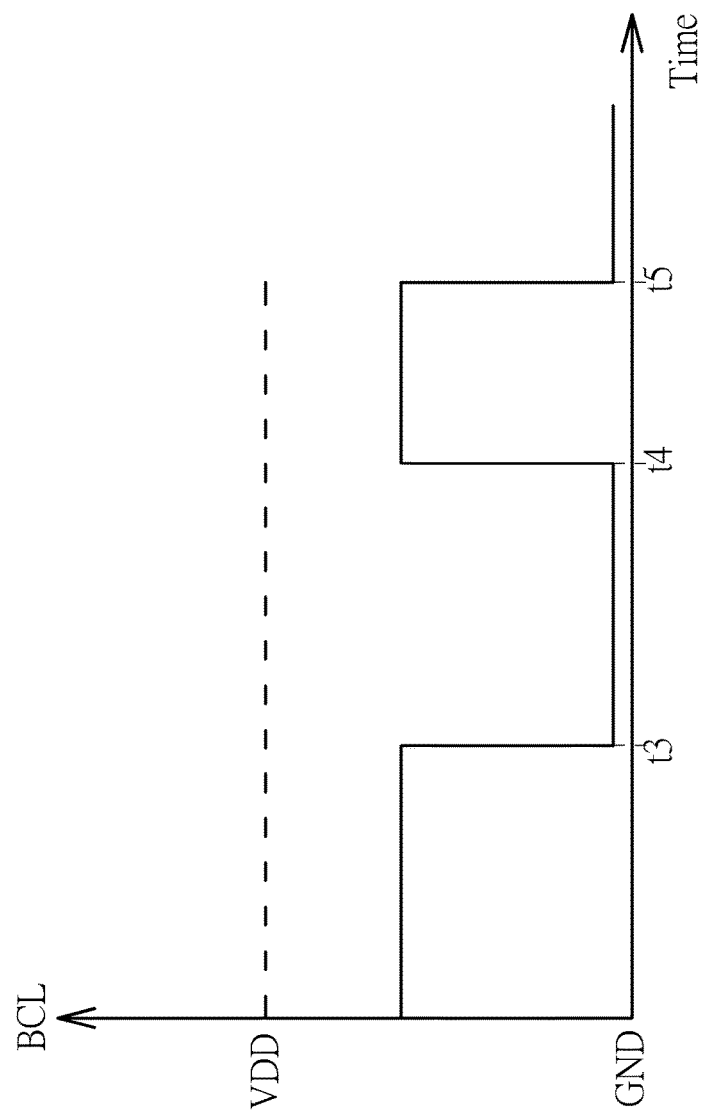
FIG. 4B is a diagram illustrating the waveform of BCL when the shipping mode is activated according to the embodiment of FIG. 3.

For the operation of shipping mode, please refer to FIG. 3 in conjunction with FIG. 4A and FIG. 4B. FIG. 4A is a diagram illustrating a waveform of BCL when the shipping mode is deactivated or released according to the embodiment of FIG. 3. FIG. 4B is a diagram illustrating the waveform of BCL when the shipping mode is activated according to the embodiment of FIG. 3. When the system 300 (or the battery 305) enters the shipping mode, the control circuit 3053 controls the switch units SW1 and SW2 to be closed. In addition, the control circuit 3053 controls the switch unit SW5 to be open and the switch unit SW6 to be closed under the shipping mode. Thus, under the shipping mode, the voltage level at BCL is almost equal to a logic low level GND. Since the control circuit 3053 merely consumes a smaller current and almost all discharging paths for the battery cell 1051 are disconnected, power-off leakage currents become almost zero.

When a user enables the system 300 by pressing the power key at the side of portable device 310, the switch unit SW becomes closed, and the level at BCL will become higher since the portable device 310 is arranged to charge the level at BCL via the resistor R5 and the switch unit SW based on the supply voltage at VBAT. Via the connecting interface 315, the control circuit 3053 at the side of battery 305 can detect the level at BCL by performing shipping mode detection to know whether the user presses the power key. In this situation, to deactivate or release the shipping mode, the control circuit 3503 controls the switch unit SW5 to be closed and the switch unit SW6 to be open. Accordingly, the level at BCL is charged by the portable device 310 from the ground level GND to a higher level. As shown in FIG. 4A, the vertical axis indicates the level at BCL, and the horizontal axis indicates different timings. Before timing t1, the system 300 is operating under the shipping mode. From timing t1 to timing t2, the system 300 performs shipping mode detection and detects that the level at BCL becomes higher due to that the user presses the power key. Accordingly the control circuit 3503 is arranged to control the switch unit SW5 to be closed and the switch unit SW6 to be open. After timing t2, the system 100 (or battery 105) has released/exited the shipping mode, and the level at BCL can be discharged so as to save more power.

The system 300 (or battery 305) may enter the shipping mode. As shown in FIG. 4B, it is assumed that the system 300 (or battery 305) operates under a normal mode before timing t3, and the level at BCL is kept at a higher level. To enter the shipping mode, from timing t3 to timing t4, the control circuit 3102 can send a shipping mode enable signal to the control circuit 3053 via the battery communication line BCL of the connecting interface 315. After receiving the shipping mode enable signal, the control circuit 3053 controls the switch units SW1 and SW2 to be closed. In addition, the control circuit 3053 controls the switch unit SW5 to be open and the switch unit SW6 to be closed so that the voltage level of BCL will become a lower level. As shown in 4B, the control circuit 3053 can delay several seconds (from timing t4 to timing t5) and then make the battery 305 enter the shipping mode after receiving the shipping mode enable signal during t3-t4 via the battery communication line BCL of connecting interface 115.

Figure 5:
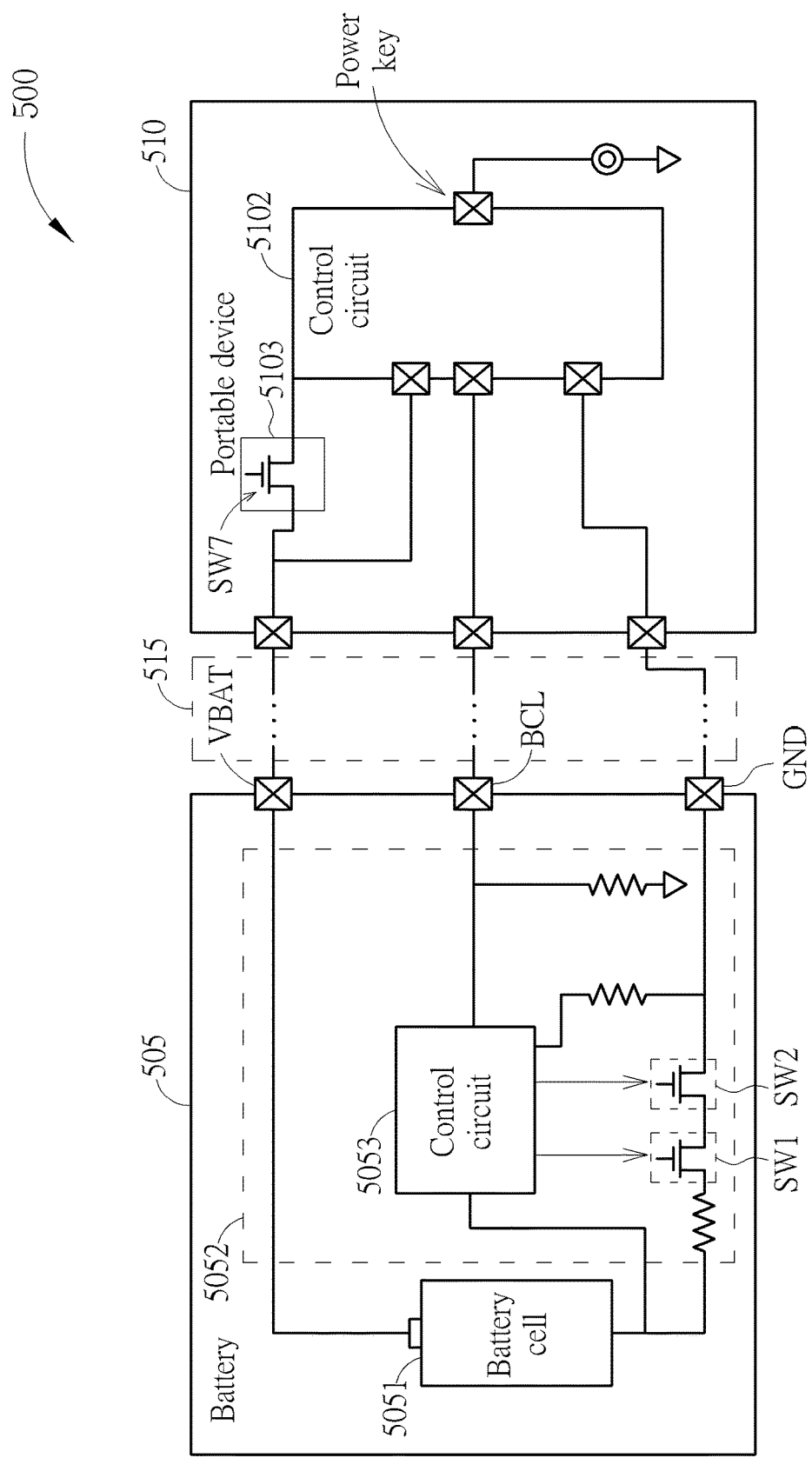
FIG. 5 is a diagram of a system according to a third embodiment of the invention.
Figure 6:
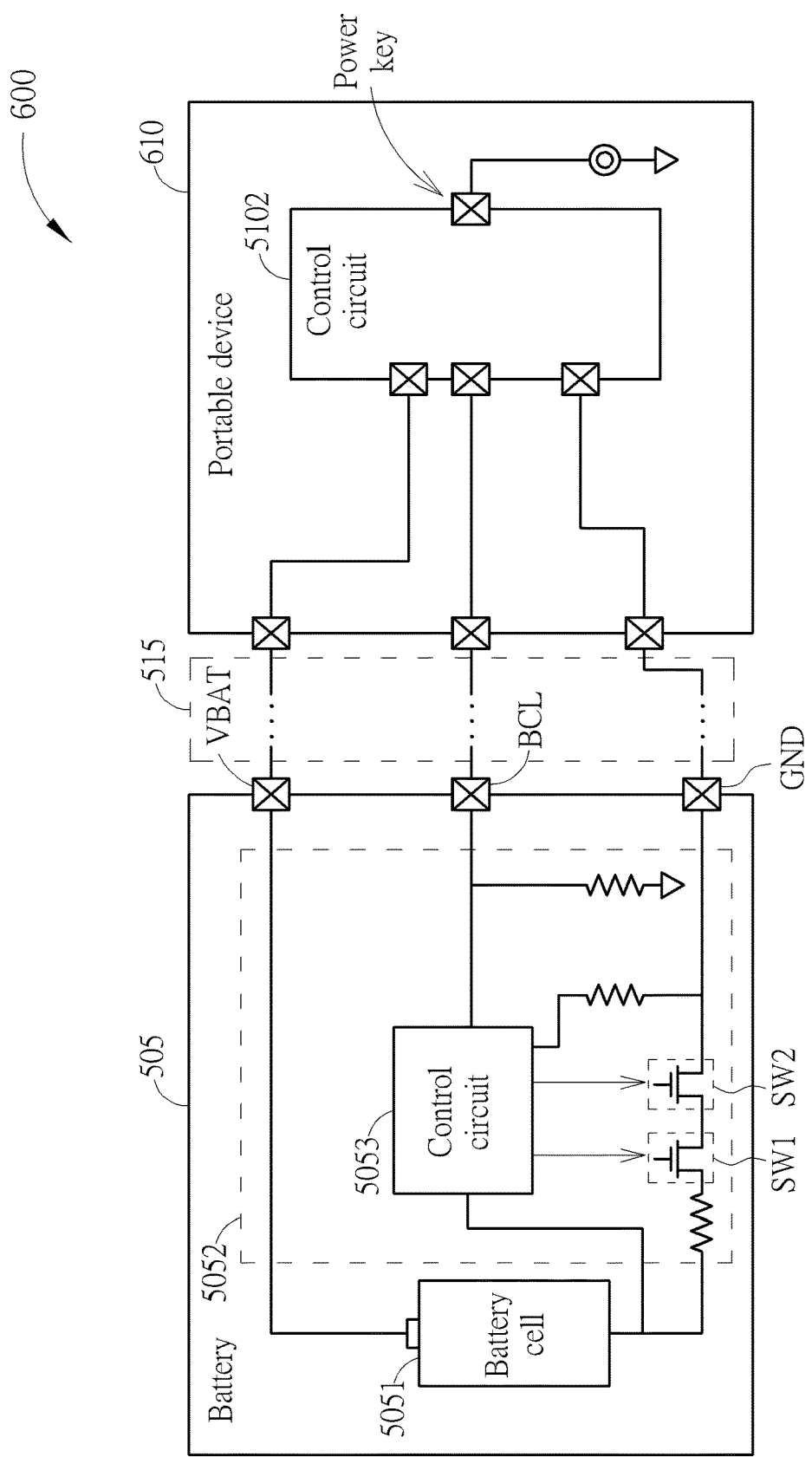
FIG. 6 is a diagram of a system according to a fourth embodiment of the invention.

Further, in other embodiments, a portable device may control a battery to enter the shipping mode or exit the shipping mode according to a change of a voltage level at the supply line VBAT of a specific connecting interface and/or a signal transmission of the supply line VBAT of a specific connecting interface. Please refer to FIG. 5, which is a diagram of a system 500 according to a third embodiment of the invention. As shown in FIG. 5, the system 500 comprises a battery 505, a portable device 510, and a connecting interface 515 used for connecting between the battery 505 and portable device 510. The portable device 510 comprises a control circuit 5102 and a charger circuit 5103 that includes a switch unit SW7. The switch unit SW7 is configured for selectively enabling/disabling the power path of the supply line VBAT connecting between the battery 505 and portable device 510, so that the voltage level at the supply line VBAT will be changed. When the system 500 (or the battery 505) operates under the shipping mode, the control circuit 5102 controls the switch unit SW7 of the charger circuit 5103 to be open. That is, the charger circuit 5103 is disabled under the shipping mode, and the power path is disconnected. Accordingly the portable device 510 would not consume too many currents from the battery 505. The portable device 505 becomes almost disabled, and power-off leaking currents are small. When a user presses the power key to enable the system 500, the portable device 510 is enabled and then used to enable the charger circuit 5103. Accordingly, the switch unit SW7 becomes closed, and the battery 505 can be arranged for providing power for the portable device 510 via the connecting interface 515. That is, by dynamically establishing or disconnecting a power path from the battery 505 to the portable device 510 via the connecting interface 515, the portable device 515 can control the battery 505 to enter the shipping mode or exit the shipping mode by equivalently changing the voltage level at the supply line VBAT from a high level to a low level. Furthermore, in other embodiments, the charger circuit 5103 may be optional. This is illustrated in FIG. 6, which is a diagram of a system 600 according to a fourth embodiment of the invention. Further description of the operations is not detailed for brevity.

In summary, in the embodiments of the invention, a portable device can make a battery enter or exit the shipping mode via a connecting interface. In practice, this may be implemented by using the supply line VBAT or the battery communication line BCL included within the connecting interface. Thus, it is not necessary to employ an additional signal port to enable/disable the shipping mode. Circuit costs can be effectively reduced. Further, it should be noted that the example of one-wire communication (BCL or VBAT) to activate/deactivate the shipping mode via the connecting interface is not meant to be a limitation of the invention. In other examples, two-wire communication to activate/deactivate the shipping mode via the connecting interface may be employed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a state of a battery connected to a portable device with a connecting interface, the method comprising:
controlling the battery to enter a shipping mode and exit the shipping mode by sending a signal from the portable device to a control circuit of the battery through the connecting interface, wherein the control circuit controls the battery to enter the shipping mode by disconnecting a battery cell of the battery from a discharging path,
wherein the connecting interface comprises a supply line that provides a power path for charging and discharging the battery and controlling the battery to enter the shipping mode and exit the shipping mode comprises controlling the battery to enter the shipping mode and exit the shipping mode based on a change of a voltage level at the supply line, and
wherein controlling the battery to enter the shipping mode and exit the shipping mode comprises:
controlling the battery to enter the shipping mode by changing the voltage level at the supply line from a high level to a low level; and
controlling the battery to exit the shipping mode when it is detected that the voltage level at the supply line has been changed by an external power key.

2. The method of claim 1, wherein controlling the battery to enter the shipping mode and exit the shipping mode comprises:
using a switch unit to selectively enable/disable the power path of the supply line connecting between the battery and the portable device so as to change the voltage level at the supply line.

3. A system, comprising:
a portable device;
a battery, coupled to the portable device, configured to provide power for the system operating on the portable device, the battery comprising a control circuit and a battery cell; and
a connecting interface, configured to connect between the portable device and the battery;
wherein the portable device is arranged to control the battery to enter a shipping mode and exit the shipping mode by sending a signal to the control circuit through the connecting interface that causes the control circuit to disconnect the battery cell from a discharging path,
wherein the connecting interface comprises a supply line that provides a power path for charging and discharging the battery and the portable device controls the battery to enter the shipping mode and exit the shipping mode based on a change of a voltage level at the supply line, and
wherein the portable device controls the battery to enter the shipping mode by changing the voltage level at the supply line from a high level to a low level; and the portable device controls the battery to exit the shipping mode when it is detected that the voltage level at the supply line has been changed by an external power key.

4. The system of claim 3 further comprising:
a switch unit, connected between the connecting interface and the battery, configured to selectively enable/disable the power path of the supply line connecting between the battery and the portable device so as to change the voltage level at the supply line.

5. A battery connected to a portable device via a connecting interface, comprising:
a battery cell; and
a control circuit, coupled to the battery cell and the connecting interface, configured to detect a signal received through the connecting interface and to control the battery to enter a shipping mode and exit the shipping mode based on the signal, wherein the battery is controlled to enter a shipping mode by disconnecting the battery cell from a discharging path,
wherein the connecting interface comprises a supply line that provides a power path for charging and discharging the battery and the control circuit is arranged to control the battery to enter the shipping mode and exit the shipping mode based on a change of a voltage level at the supply line, and
wherein the control circuit controls the battery to enter the shipping mode when it is detected that the voltage level at the supply line changes from a high level to a low level; and, the control circuit controls the battery to exit the shipping mode when it is detected that the voltage level at the supply line has been changed by an external power key.

* * * * *